United States Patent [19]

DeLacy

[11] 4,454,555

[45] Jun. 12, 1984

[54] VOLTAGE SENSING AND LOAD MEASURING AUTOMATIC RECLOSING SYSTEM FOR D-C CIRCUIT BREAKERS

[75] Inventor: James P. DeLacy, Havertown, Pa.

[73] Assignee: Brown Boveri Electric, Inc., Rolling Meadows, Ill.

[21] Appl. No.: 416,298

[22] Filed: Sep. 9, 1982

[51] Int. Cl.³ .............................................. H02H 11/00
[52] U.S. Cl. ...................................... 361/59; 307/139; 361/71; 361/90
[58] Field of Search ...................... 361/59, 60, 71–75, 361/90; 307/130, 139, 140, 143

[56] References Cited

U.S. PATENT DOCUMENTS 4,232,232 11/1980 DeLacy et al. ...................... 307/139

*Primary Examiner*—Harry E. Moose, Jr.
*Attorney, Agent, or Firm*—Ostrolenk, Faber, Gerb & Soffen

[57] ABSTRACT

A reclosing system for d-c feeder circuit breakers used on transit systems is disclosed. Circuit breaker closure is prevented when the feeder circuit voltage is in a predetermined voltage range and when the feeder circuit impedance is less than a given value, which is less than the impedance which would be presented by a parked train in a deenergized portion of the transit rails. A Wheatstone bridge is inserted into the circuit during the load impedance measurement. The Wheatstone bridge circuit is compensated for positive or negative rail return voltage. The automatic reclosing scheme is locked out after two closures of the circuit breaker followed by automatic tripping within six minutes, or by twelve load impedance measurements, which are performed within three minutes and which all fail to lead to a circuit breaker closure.

14 Claims, 3 Drawing Figures

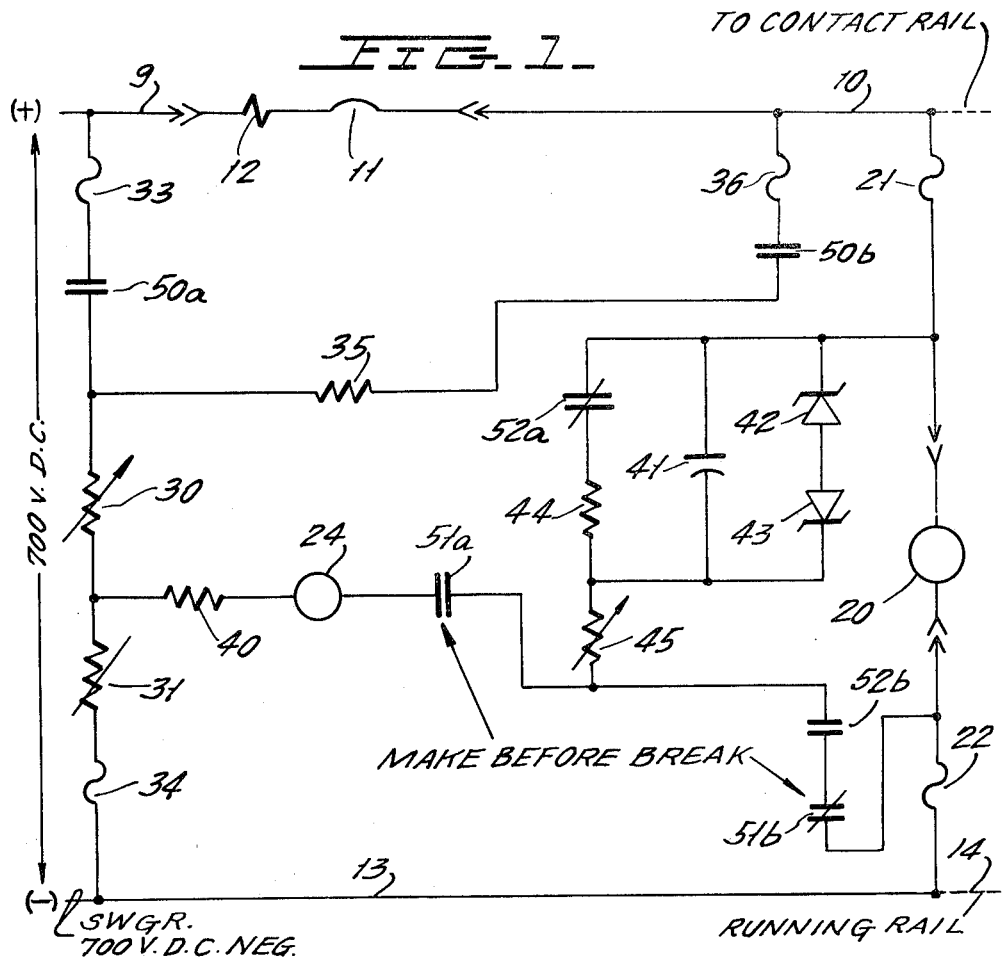
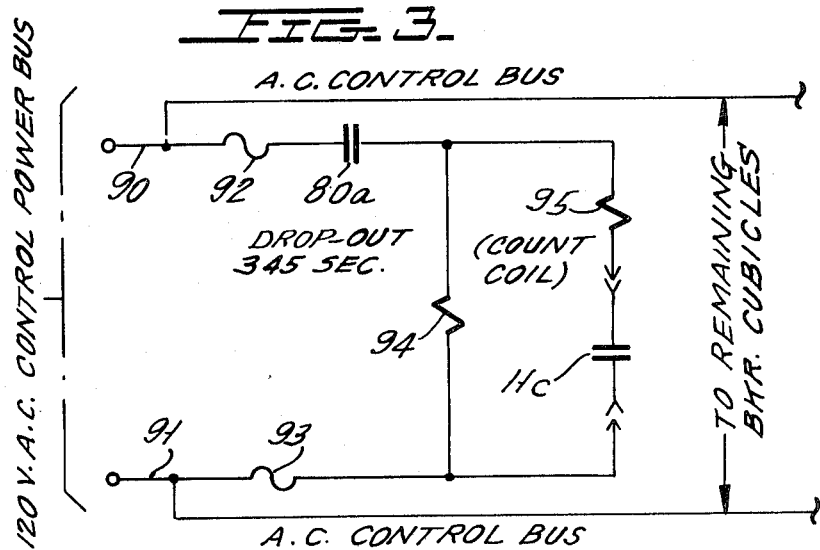

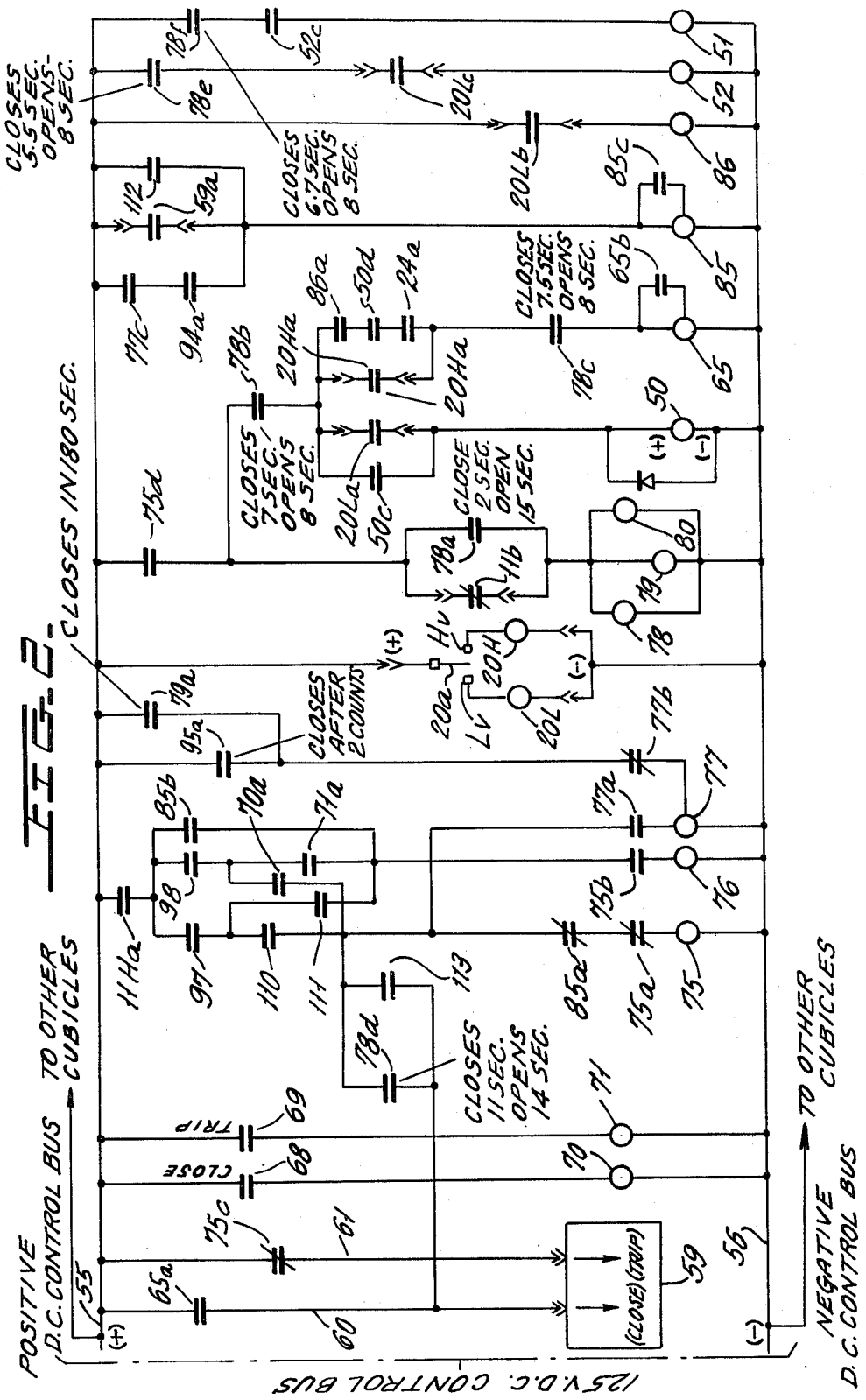

VOLTAGE SENSING AND LOAD MEASURING AUTOMATIC RECLOSING SYSTEM FOR D-C CIRCUIT BREAKERS

BACKGROUND OF THE INVENTION

This invention relates to control systems for d-c feeder breakers employed in transit type systems, and more specifically relates to a novel automatic reclosing system which has improved system impedance measurement sensitivity and improved operation over a wide range of system voltages.

Control systems for d-c feeder breakers in transit-type systems are well known. One such system is disclosed in U.S. Pat. No. 4,232,232 in the names of DeLacy and Lechner entitled "VOLTAGE SENSING AND LOAD MEASURING AUTOMATIC RECLOSING SYSTEM FOR D-C CIRCUIT BREAKERS". The system shown therein provides a method for measuring transit system conditions before permitting the closure of a d-c feeder breaker. Thus, the system first automatically measures rail voltage. Closing of the feeder breaker is then permitted if the feeder voltage is above, for example, 400 volts, since this measurement indicates the absence of a fault. If, however, the monitored voltage is lower than 200 volts, the integrity of the feeder system is further measured by injecting a current into the system and measuring the voltage drop across the feeder circuit produced by the injected current. If the voltage drop measured is greater than 200 volts, there is no fault on the feeder circuit and the closing of the feeder breaker is permitted. If the measured feeder voltage is intermediate the high and low voltages referred to above, which permitted feeder breaker closure, and initiated the load measuring mode, respectively, the breaker is prevented from closing. Moreover, if, during the impedance measurement carried out in the load measuring mode, it is found that the impedance of the feeder circuit is lower than a given value, which would indicate a short circuit in the feeder circuit, the breaker is prohibited from closing. The above measurement modes are repeated automatically a given number of times. If breaker closure does not occur after a given number of attempts, the breaker system is locked out.

While the above system works very well, the measurement process cannot be used on a feeder circuit in older transit systems when trains are parked on a deenergized section of the circuit. These trains form a relatively low impedance between the third rail and the tracks of such systems which might be approximately 0.2 ohm for an eight-car train.

The prior art circuit described above does not measure impedance low enough in the load measuring mode to differentiate the 0.2 ohm load from a faulted circuit. Thus, the existing circuit can operate improperly in systems in which there is a very low impedance load which might be interpreted as a short circuit by the measuring system.

BRIEF DESCRIPTION OF THE INVENTION

In accordance with the present invention, the circuit shown and described in U.S. Pat. No. 4,232,232 is modified to employ a more sensitive impedance measurement during the load measuring mode than was previously possible and the voltage sensing circuits and load measuring circuits are formed independently of one another to have wider application.

More specifically, and in accordance with one aspect of the invention, a Wheatstone bridge arranged network is inserted into the circuit during the load measuring operation such that the transit network resistance is in one arm of the bridge, while a reference resistor is in another bridge arm. If the measured load resistance is sufficiently lower than the reference resistance, the bridge measurement current through a relay coil is insufficient to cause feeder breaker closure. If, however, the resistance measurement indicates a network resistance consistent with an unshorted network, the current through the bridge monitoring relay coil will permit subsequent breaker closure. Since a Wheatstone bridge arrangement is provided, the resistance measurement of the network resistance can differentiate between very low resistance values, for example between 0.1 ohm and 0.2 ohm of the load impedance over the entire source voltage range.

As a further feature of the invention and in order to make the Wheatstone bridge measurement sufficiently sensitive, a reference capacitor is initially inserted into the circuit and then charged to whatever voltage may exist on the rails. This voltage is then stored in the capacitor and is subsequently connected in opposition to the rail voltage during the Wheatstone bridge measurement. Thus, the Wheatstone bridge measurement will have maximum sensitivity and will take into account both positive and negative return rail voltages.

Further in accordance with the present invention, the voltage sensing function of the circuitry is not intermixed with the current measuring features as is the case in U.S. Pat. No. 4,232,232. In accordance with an important feature of the present invention, the two functions of load sensing and current measurement are separated so that the circuits are substantially simplified and will operate over a wide range of source voltages.

BRIEF DESCRIPTION OF THE DRAWINGS

FIG. 1 is a circuit diagram of the power system circuitry used in accordance with the present invention;

FIG. 2 is a circuit diagram of the d-c portion of the control circuit which is used in accordance with the invention; and FIG. 3 is a auxiliary control circuit operated from an a-c source which is used in conjunction with the d-c control circuit of FIG. 2 and the power circuit of FIG. 1.

DETAILED DESCRIPTION OF THE PREFERRED EMBODIMENT

Referring first to FIG. 1, there is shown a power system circuit which includes a positive switchboard d-c main bus 9 which may be at 1,000 volts d-c. The d-c bus 9 is connected through the d-c feeder circuit breaker 11 which is, in turn, connected to the transit contact rail 10. A trip coil 12 of conventional design is connected in series with the contacts of the d-c feeder breaker 11 and serves to automatically open breaker 11 under given fault conditions. The system negative bus 13 is connected to the transit system running rail 14 in the usual manner. A power voltage may be applied across buses 9 and 13 and may be typically 700 volts d-c.

The present invention involves a circuit and method for operating the circuit such that the feeder circuit breaker 11 cannot be closed if there is a fault on the feeder circuit connected to the contact rail 10 and the running rail 14 of the transit system. It will be noted that while the invention is described herein in connection with the control of the closing of the feeder breaker 11 in a transit system, the invention can be employed in any system in which the closing of a breaker can take place only when the output circuit is unfaulted.

Several of the control components are contained directly in the power circuit of FIG. 1. One is the relay coil 20 which is connected directly across the rails 10 and 13 and in series with fuses 21 and 22. Relay coil 20 is an under-and-over voltage relay and has auxiliary coils 20H and 20L, shown in FIG. 2 which have appropriate contacts which will be described.

In the convention used herein, each relay coil may have one or more contacts associated therewith and these contacts will be identified by the same numeral as the coil but the numeral will be followed by a lower case letter. Moreover, in the convention herein, the contacts are shown in the position they assume as when their associated relay coil is deenergized.

The relay coil 20 is such that when the voltage between conductors 10 and 13 is less than 30 volts, contact 20a is moved from a center position to the left position marked "LV" and coil 20L of FIG. 2 is energized. If the voltage between contact rail 10 and bus 13 is greater than 400 volts, coil 20H will be energized and contact 20a will be moved to the right to engage contact HV. For voltages intermediate 30 volts and 400 volts, the contact 20a will be in the central position shown in FIG. 2.

Coil 20L has associated therewith contacts 20La, 20Lb and 20Lc shown in FIG. 2, while coil 20H has associated therewith a contact 20Ha shown in FIG. 2. The relay coil 20 and its coils 20L and 20H and their contacts function in the voltage measuring process of the novel system, as will be later described.

Coil 24 of FIG. 1 has a contact 24a, shown in FIG. 2, where the coil 24 is used to analyze the Wheatstone bridge measurement of impedance during the load current measurement portion of the novel process. As shown in FIG. 1, a Wheatstone bridge circuit is completed when the circuit breaker 11 is open and certain relay contacts are closed. The Wheatstone bridge also includes resistors 30 and 31 which are connected through fuses 33 and 34 to the d-c bus 9 and negative bus 13, respectively. A relay contact, which will be later described, is interposed between resistor 30 and fuse 33. Resistors 30 and 31 may have values of 4,000 ohms and 6 ohms, respectively, and define respective arms of one branch of the Wheatstone bridge.

A third arm of the bridge is formed by resistor 35 which is known as the load measuring resistor. The load measuring resistor 35 may have a resistance of 53 ohms. The load measuring resistor 35 is connected through a relay contact to be later described, a fuse 36 and to the contact rail 10. The fourth resistor of the bridge consists of the feeder circuit impedance between contact rail 10 and running rail 14.

The contact rail 10 serves as the junction between the two resistors in the Wheatstone bridge branch including load measuring resistor 35 and the circuit impedance. Relay coil 24 is connected across the two junctions of the two bridge branches and is connected through resistor 40 which may be a 900 ohm resistor, and through various relay contacts and a capacitor 41 which will be later described. A pair of series-connected opposing polarity zener diodes 42 and 43 are connected across capacitor 41.

A pair of resistors 44 and 45 are also connected as shown relative to capacitor 41. Resistor 45 can have a value of 2,500 ohms.

The various relay contacts which are also associated with the resistors of the Wheatstone bridge of FIG. 1 will be operated to appropriately insert the bridge in the circuit at a suitable time during the measuring cycle. Thus, a relay coil 50 shown in FIG. 2 has normally open contacts 50a and 50b in FIG. 1 which control the insertion of the load measuring resistor 35 across the open circuit breaker 11 at a suitable time in the measuring process. Relay contacts 50c and 50d are also associated with relay 50 and are shown above the relay coil 50.

To the extreme right in FIG. 2 is a relay coil 51 which has relay contacts shown in FIG. 1 and includes relay contact 51a which is normally open and relay contact 51b which is normally closed.

To the left of coil 51 in FIG. 2 is a coil 52 which has associated therewith normally closed contact 52a and normally open contact 52b in FIG. 1. A contact 52c is also provided in series with coil 51 as shown in FIG. 2.

The above completes the description of the essential components in the power circuit of FIG. 1. The function of coils 51 and 52, to be described more fully hereinafter, is to appropriately connect the load current monitoring coil 24 and capacitor 41 during the load measuring operation.

Turning next to FIG. 2, there is shown therein the d-c relay control portion of the system of the invention. Thus, in FIG. 2, there is shown positive and negative d-c buses 55 and 56 which are associated with a particular switch-gear cubicle and are connected to a 125 volt d-c control power source. Fuses (not shown) may be connected in series with buses 55 and 56, respectively.

The control mechanism and circuitry for the circuit breaker 11 of FIG. 1 is schematically shown by the block 59 in FIG. 2. This control circuitry includes a first conductor 60 which can be energized by the closure of a contact to be described, in order to close the circuit breaker 11. The energization of conductor 61, by closure of a relay contact in series therewith, which will be described, causes the tripping of the breaker 11. Any suitable control mechanism and circuit can be employed within block 59. The control block 59 can also employ suitable manually operated contacts (not shown) for test closing and test tripping.

In order to close the circuit breaker 11, the relay coil 65, which is to the immediate right of coil 50, must ultimately be energized. The energization of coil 65 will cause the closing of normally open contact 65a in the close circuit of mechanism 59. The energization of coil 65 will also cause the operation of its normally closed seal-in contact 65b.

The circuit breaker 11 has conventional auxiliary contacts which change position when the circuit breaker is operated. Thus, in FIG. 2, circuit breaker contact 11b opens when the circuit breaker 11 closes. A further circuit breaker contact 11c is contained in the a-c control circuit of FIG. 3 and closes when the circuit breaker closes. Contact 11Ha is a circuit breaker position contact. It is closed when the circuit breaker is in the fully connected position. It disconnects the load measuring-automatic reclosing circuitry if the breaker is in its test position.

To the right of block 59 in FIG. 2, there is the supervisory closing circuit which consists of a remotely operable contact 68 which can be closed to initiate the closing sequence for the circuit breaker 11. Close contact 68 is connected in series with coil 70 which has relay contact 70a associated threwith. A remotely operable trip contact 69 is next provided in series with coil 71 which is operable to trip the circuit breaker 11. Coil 71 is associated with a contact 71a immediately to the right of contact 70a in FIG. 2.

There is next provided a latch type relay having an operate coil 75 and a reset coil 76. Coil 75 has associated therewith contacts 75a, 75b, 75c, and 75d. to the right of coil 76 is a further latch relay 77 which has contacts 77a, 77b and 77c associated therewith.

There is next provided parallel arranged timing relay coils 78, 79 and 80. Relay 78 is a timing relay; relay 79 is an incomplete sequence timing relay; and relay 80 is a counter timer.

Relay 78 has contacts 78a to 78f associated therewith. These contacts have the timing shown in the following table, where the times shown are measured from the instant of energization of coil 78:

| CONTACT | CLOSE | OPEN |
| --- | --- | --- |
| 78a | 2 seconds | 15 seconds |
| 78b | 7 seconds | 8 seconds |
| 78c | 7.5 seconds | 8 seconds |
| 78d | 11 seconds | 14 seconds |
| 78e | 5.5 seconds | 8 seconds |
| 78f | 6.7 seconds | 8 seconds |

The incomplete sequence timing relay coil 79 has associated therewith contact 79a which closes 180 seconds following the energization of coil 79.

The counter timer coil 80 has associated therewith contact 80a, shown in the a-c control system of FIG. 3. As will be later described, this contact opens in 345 seconds after energization of coil 80.

FIG. 2 next shows a relay having a relay coil 85 which has associated therewith contact 85a in series with coil 75, contact 85b in series with coil 76 and contact 11Ha and contact 85c. The last relay coil in FIG. 2 is the coil 86 which has associated therewith contact 86a in series with coil 65. This circuitry of FIG. 2 further includes contacts 110, 111, 112 and 113. These provide the ability to bypass load measuring automatic reclosing from either remote or local positions. To achieve bypassing from remote, contact 78d is used. To achieve bypassing from local, contact 113 is used. The actual operation will be described later.

Two switches 97 and 98 are also shown in FIG. 2 in direct series with coils 75 and 76, respectively. Switches 97 and 98 are manually operable switches which select for either local (or in-station control) or remote (or supervisory control) respectively.

There are emergency conditions, such as fire in the substation, wherein it is deemed necessary to trip (all of) the circuit breaker(s) and prevent load measuring-automatic reclosing from re-closing the circuit breaker. As described later, this action is achieved by closing contact 112. If switch 97 is closed for local operation, then when contact 110 is closed, the closing sequence for the circuit breaker 11 is initiated. If switch 97 is closed for local operation, then when contact 111 is closed, circuit breaker 11 will be tripped.

The a-c control section is shown in FIG. 3 and includes a 120 volt a-c control power bus having lines 90 and 91 which are connected through fuses 92 and 93 across contact 80a and a master coil 94. The master coil 94 has associated therewith contacts in FIG. 2 shown as contacts 94a. Also provided in FIG. 3 is a count coil 95 which counts the number of closings. The count coil 95 has associated therewith contact 95a in FIG. 2 which is in parallel with contact 79a and which closes after two counts.

Before describing this operation in detail, it will be useful to first describe the overall operation of the system without reference to specific relays or contacts. The following initial assumptions first apply:

1. The traction station d-c power bus is energized.
2. The train resistance of any train on a deenergized rail will be approximately 0.2 ohm or higher.
3. Feeder breaker 11 is open.
4. The local/remote switching device 97 or 98 is closed.
5. The feeder voltage sensing relay device 20 of FIG. 1 and its internal auxiliary devices 20L and 20H are calibrated so that device 20L becomes energized through main contact 20a when the feeder voltage is below 30 volts and device 20H becomes energized through contact 20a when the feeder voltage is above 400 volts.

With the above initial assumptions, the d-c feeder breaker automatic closing system generally operates as follows:

To initiate the system operation the applicable in-station or supervisory breaker control switch 110 or 68 is closed. Within ten seconds after operation of the breaker control switch 110 or 68, the automatic reclosing system, via its voltage sensing and load measuring modes, will have established the system's integrity and operate to allow or prevent the closing of breaker 11. The respective mode employed to effect breaker closing is a function of the system voltage or lack of voltage as interpreted by the relay 20. Breaker closure will be effected by relay 20 if there is good system voltage or by the relay 24 of FIG. 1 if there is essentially zero system voltage.

More specifically, the following sequence of operation will occur:

1. If the system is energized from the remote feeder and the voltage is above 400 volts, relay 20 interprets this voltage level as a non-faulted system and effects a close signal to the local feeder breaker 11. The breaker closes and the automatic reclosing system continues on to a reset condition.
2. If the system is energized from the remote feeder and the voltage is equal to or below 400 volts but above 30 volts, device 20 interprets the system as being unstable and prevents closure of breaker 11. The load measuring automatic reclosing circuitry will then recycle and reattempt breaker closure.
3. If the system is at 30 volts or below, which could be due to the presence of a return rail voltage from current existing in the cross-bonded negative rails and low ohmic load across the positive to negative rails, the device 20 interprets this system condition and the circuit switches to a load measuring mode to establish system integrity.
4. In the load measuring mode, the Wheatstone bridge circuit of FIG. 1 is introduced into the system. During the load measuring mode, if there is bus voltage available, current will flow through the resistive bridge. If the system resistance is approximately 0.2 ohm (equivalent to a 3,500 ampere load) or higher, the device 24 which is connected across the midpoints of the bridge, will initiate closure of circuit breaker 11. If, however, the system resistance is less than 0.2 ohm, the device 24 will not permit breaker closure. The load measuring circuitry will also take into account return rail voltage. Thus, if return rail voltage is present across rails 10 and 14 when the system resistance is less than 0.2 ohm, the device 24 could be fooled into initiating breaker closure. To prevent fooling of device 24, a memory circuit including capacitor 41 is connected across the system just prior to the load measuring operation. The capacitor 41 will charge to the return rail voltage and, when placed in series with device 24, will oppose the return rail voltage during the Wheatstone bridge measurement. Thus, fooling of the device 24 is prevented.

5. If the load measuring circuit determines that the system resistance is less than 0.2 ohm, it can be presumed that there is a short circuit across the rails and circuit breaker 11 will not close. The circuitry will, however, recycle to again attempt to close and closure will occur if the system conditions have changed. If system conditions have not changed within 12 cycles, the load measuring automatic reclosing circuitry will lock out and can be reset only after another close command is given from either a local or remote source.

6. If the load measuring and automatic reclosing circuitry closes the circuit breaker and the breaker subsequently trips and the load measuring automatic reclosing circuitry again recloses the breaker, all within 6 minutes, then the breaker will be tripped out by the load measuring automatic reclosing circuit and the circuit will lock itself out. The load measuring automatic reclose circuit can then be reset only after a close command is given from a local or remote source.

It is now possible to consider the detailed operation of the relay scheme of FIGS. 1, 2 and 3. If contact 97 is closed, i.e. local, then when contact 110 is closed, relay coil 75 will be energized. This coil is energized because:

1. Contact 11Ha is closed because the breaker 11 is in the fully connected position.
2. Contact 97 is closed because local operation is desired.
3. Contact 110 is operated closed to initiate load measuring-automatic reclosing.
4. Contacts 85a and 75a are normally closed.
5. There is now a complete circuit from the positive control bus to the negative control bus to energize relay coil 75.

Similarly, to energize relay coil 75 from remote, contact 98 must be closed. Now when remote contact 68 is closed, relay coil 70 becomes energized. Therefore, contact 70a in series with contacts 11Ha, 98, 85a, 75a and relay coil 75 is closed. Therefore, relay coil 75 becomes energized. When relay coil 75 is energized, it latches.

The energization of contact 75 causes the following sequence to occur:

a. Contact 75a opens to deenergize latch-in operating coil 75.
b. Contact 75b closes in the deenergized control circuit of reset coil 76.
c. Normally closed contact 75c in series with the trip input to the circuit breaker control 59 is opened to remove the trip input to the breaker 11.
d. Contact 75d closes and, with the associated closed breaker contact 11b, initiates the automatic reclosing system.

The closing of contact 75d initiates the automatic reclosing system and energizes the timing relay device 78, the incomplete sequence timing relay device 79 and the counter timer device 80. Two seconds after contact 75d closes, contact 78a of relay 78 closes to seal in across the circuit breaker contact 11b. Thus, if and when the circuit breaker 11 closes and contact 11b opens, the coils 78, 79 and 80 will still be energized.

Devices 78, 79 and 80 continue to time after this two-second period but no further contact operation occurs for five seconds to allow for stabilization of post-fault feeder conditions.

After seven seconds following the energization of coil 75 and the closing of contact 75d, contact 78b closes to initiate the voltage sensing mode of operation of the system. The voltage sensing mode of operation is as follows:

If the feeder system is energized from its remote end and the voltage is above 400 volts, the main contact 20a of device 20 is closed to the HV terminal in FIG. 2 so that internal coil 20H is energized. This causes the closing of normally open contact 20Ha in series with contact 78b. After an additional half-second and at 7.5 seconds after the energization of coil 78, contact 78c closes and coil 65 is energized. The energization of coil 65 causes the closing of contact 65a in series with the close circuit of operating mechanism 59 so that the circuit breaker closes. Accordingly, since the measured voltage on the system was 400 volts or higher, it is permissible to close the circuit breaker 11 and this action occurs.

Following the closing of the circuit breaker 11, timing device 78 continues to run through its cycle and at the end of 15 seconds contact 78a opens. Since contact 11b opened when the breaker closed, coils 78, 79 and 80 are deenergized and the automatic reclosing system is fully reset.

Consider next the situation if the feeder system is energized from its remote end but the voltage is lower than 400 volts but above 30 volts. In this situation, relay 20 interprets the voltage level as unstable and contact 20a remains centered as shown in FIG. 2. Consequently, neither of coils 20L or 20H is energized. Therefore, the closing sequence for closing breaker 11 cannot continue (since neither coil 50 or 65 is energized), and the load measuring automatic reclose system simply recycles at the end of 15 seconds for another look at the system after the recycling is terminated.

Consider next the situation if the system voltage is below 30 volts. In this case, the load measuring circuitry will automatically enter the load measuring mode of operation. The load measuring mode of operation is as follows:

The main contact 20a of device 20 engages the terminal labeled LV so that the coil 20L is energized. After 5.5 seconds into the cycle, timer contact 78e closes. Since contact 20Lc was previously closed with the energization of coil 20L, relay coil 52 is energized through contacts 78e and 20Lc. The energization of relay coil 52 will cause the opening of contact 52a in FIG. 1 and the closing of contact 52b in FIG. 1 in order to connect capacitor 41 in series between contact rail 10 and running rail 14. Capacitor 41 will then charge to whatever voltage appears between contact rail 10 and running rail 14.

After 6.7 seconds into the load measuring cycle, contact 78f, which is in series with coil 51, closes. Note that the prior energization of coil 52 caused contact 52c also to close, so that the coil 51 becomes energized. The energization of coil 51 of FIG. 2 causes the closing of contact 51a and the opening of contact 51b in FIG. 1. The operation of these two contacts places the charged capacitor 41, which is at the voltage which exists between contact rail 10 and running rail 14, in series with the relay coil 24 and in such a circuit position that it will oppose any return rail voltage during a subsequent impedance measurement.

After 7 seconds into the cycle, timer contact 78b closes. Since contact 20La was previously closed and since contact 75d is also closed, coil 50 will be energized. The energization of coil 50 causes the closing of its contact 50c which seals the relay coil in the energized condition and also closes its contact 50d in the series circuit which includes relay coil 65.

The energization of coil 50 of FIG. 2 also causes the closing of contacts 50a and 50b in FIG. 1 so that the Wheatstone bridge resistors are connected in circuit relationship with respect to the contact rail 10 and the negative bus 13, with the relay coil 24 connected between the null points of the bridge. Note that the system impedance appearing between contact rail 10 and running rail 14 will be connected in one arm of the bridge. Moreover, the charged capacitor 41 is connected in the measuring circuit in series with coil 24 and in opposition to the return rail voltage.

Assume first that the impedance between contact rail 10 and running rail 14 is considerably less than about 0.2 ohm. Under this circumstance, current will flow in FIG. 1 from positive bus 9 through fuse 33, contact 50a, resistor 30, resistor 40, coil 24, closed contacts 51a, 52b, 51b, fuse 22 to the running rail 14. Current flow in this direction through the coil 24 signifies a load resistance which is too low, so that breaker closure cannot be initiated by the breaker closing contacts associated with coil 24. Coil 24 is a current sensing device whose construction is similar to the voltage sensing device, coil 20. Current flowing through coil 24 in the direction from resistor 40 to contact 51a forces the centrally located movable contact to move to the right. Movement in this direction is representative of a short circuit condition. Therefore, breaker closure is not allowed.

If sufficient current is flowing through coil 24 in the direction from contact 51a to resistor 40, then the centrally located movable contact (24a in FIG. 2) will move to close position on the left. Closure of contact 24a is indicative of a system that has 0.2 ohm or higher impedance; thus, breaker closure is allowed.

If, however, the load resistance is 0.2 ohm or higher, current flow will exist in a direction opposite to that previously described and from the contact rail 10 through capacitor 41, through coil 24 and resistor 40 to the junction between resistors 30 and 31 to the negative bus 13. This current flow will be sufficiently high to energize the coil 24 to cause operation of its contacts and subsequent closure of the circuit breaker 11. Thus, energization of coil 24 by current flow from the right to the left in FIG. 1 will cause closure of contact 24a in FIG. 2 which is in series with coil 65. Contacts 75d, 78b, 86a and 50d were previously closed. Consequently, at 7.5 seconds into the cycle when contact 78c closes, coil 65 is energized. Its contact 65a in series with the circuit breaker close circuit 59 is then closed to energize mechanism 59 and close the circuit breaker 11.

Following the closure of the circuit breaker 11 due to a successful impedance measurement in the load measuring mode, and at the end of 8 seconds into the cycle, each of timer contacts 78b, 78c, 78e and 78f opens. Timer contact 78a opens after 15 seconds into the cycle. Since the breaker contact 11b was opened when the circuit breaker 11 closed, the coils 78, 79 and 80 are then all deenergized and the load measuring automatic reclosing circuitry is reset to the ready position.

Assume next that following a successful closure, due either to the voltage sensing mode or the load measuring mode, the circuit breaker 11 trips open due to a fault on the feeder circuit. The system will then automatically recycle for a new breaker closure operation. Thus, while the circuit breaker 11 was closed, contact 75d was also closed. Consequently, when the breaker 11 reopens, contact 11b in series with contact 75d recloses, and the coils of timing relays 78, 79 and 80 are energized. The load measuring automatic reclosing system is thus reinitiated as described above. If, at the time the circuit breaker is to be closed, the system appears normal, the circuit breaker 11 will reclose. However, there are instances in which the fault which caused the circuit breaker 11 to trip initially will, itself, be temporarily extinguished by the fault current. Thus, the load measuring automatic reclosing system will not sense a fault and will be able to reclose the circuit breaker 11. However, each time the system voltage is reapplied to the feeder, the fault may reappear and cause the breaker to reopen and again reinitiate the reclosing sequence. In the prior art, this sequence could repeat indefinitely. In accordance with the present invention, however, the cycling of breaker closing and tripping is limited to two times within six minutes.

The lock-out circuitry includes latch-type relay 77 of FIG. 2. Each time a close operation initiates a load measuring operation, dropout relay coil 80 closes its contact 80a in the a-c control circuit of FIG. 3. The closing of contact 80a in FIG. 3 causes energization of the master coil of device 94. As soon as the coil of device 94 is energized, its contact 94a in FIG. 2, which is in series with coil 85, is closed. However, since no fault was measured by the load-measuring circuitry, the circuit breaker 11 closes, so that circuit breaker contact 11c, shown in FIG. 3, closes and energizes the count coil 95 in series therewith. The count coil 95 then moves one count. The energization of the count coil 95, after two counts within six minutes, will close contact 95a of FIG. 2 which is connected to the latch relay coil 77, thus energizing and latching the latch relay 77. The latch relay contact 77b will open and contact 77c will close. The closing of contact 77c energizes coil 85 through the closed contact 94a. Contact 85b then closes to energize reset coil 76 which is immediately deenergized by the opening of contact 75b.

Contact 75a of device 75 also closes but nothing happens in this circuit. Finally, contact 75c in the trip circuit lead 61 of device 59 closes to put a trip signal onto the circuit breaker 11. Contact 75d then opens to fully defeat the automatic reclosing circuitry. Relay coil 80 is deenergized and its contacts 80a in FIG. 3 will open after 345 seconds to deenergize the master coil of the count coil 95. Therefore, contact 94a in series with coil 85 in FIG. 2 will open and all relays are fully deenergized. The above operation will then prevent the reclosing of the circuit breaker more than two times within six minutes under either the load measuring or voltage measuring modes of closure.

A novel lock-out arrangement is also provided to permit the system to be examined a given number of times if each examination terminates with a failure to close the breaker. This system too, however, is locked out after a predetermined number of attempts. Thus, if the system load resistance is measured to be less than 0.2 ohm, signifying an excessive load condition, the circuit breaker 11 is prevented from closing as described earlier. However, the novel automatic reclosing system of the invention permits the automatic repetition of the automatic reclosing cycle for another 11 cycles to determine whether the abnormal condition which prevents the circuit breaker closure persists in the system. If, at the end of the 12th cycle (after 3 minutes), the abnormal condition still prevails, the automatic reclosing system will be locked out and can only be initiated by a new close operation. This recycling operation proceeds as follows:

When coil 80 is initially energized, its contact 80a of FIG. 3 closes and the master coil of device 94 (FIG. 3) becomes energized. Its contact 94a in series with coil 85 in FIG. 2 then closes. After three minutes have elapsed, contact 79a of relay coil 79 closes in order to energize and to latch the latch relay 77. Contact 77b of relay coil 77 then opens to deenergize the circuit completed by the closure of contact 79a. The contact 77c in series with coil 85 then closes to energize device 85. Contact 85b, in series with contacts 11Ha and coil 76, closes to energize reset coil 76. Coil 76 is immediately deenergized by the opening of contact 75b. Contact 75a will also close but nothing happens in that circuit. Thereafter, contact 75c in the trip circuit lead 61 closes to put a trip signal back onto the circuit breaker mechanism 55, thereby to trip the circuit breaker 11. Contact 75d opens to fully defeat the automatic reclosing circuitry. Thus, devices 79 and 80 are deenergized. Contact 79a immediately opens. Contact 80a in FIG. 3 opens after 345 seconds, thereby to deenergize the master coil 94 (FIG. 3). Thus, contacts 94a will open to deenergize coil 85 and all relays are deenergized.

Suitable means are provided for bypassing the load measuring-automatic reclosing circuity and, therefore, closing the circuit breaker directly. Thus, with switch 97 closed, "local" operation is chosen. If switch 110 is now closed, load measuring-automatic reclosing will be initiated as described above. If, however, just after switch 110 is closed, contact 113 is manually closed, then the close circuit of mechanism 59 is energized and circuit breaker 11 is closed. Also, since the load measuring-automatic reclosing circuitry was initiated, contact 75d is closed and the circuit breaker is set up for automatic operation.

Similarly, with switch 98 selected to be closed, "remote" operation is chosen. Now if contact 68 is closed from remote, coil 70 is energized and load measuring-automatic reclosing is initiated as described previously. If, however, the circuit breaker 11 does not close after 11 seconds have elapsed into the load measuring-automatic reclosing cycle, the circuit breaker 11 may be closed as follows: At the eleventh second contact 78d will close for three seconds. If during this period of time contact 68 is again closed from remote, coil 70 is re-energized and its contact 70a closes. Therefore, the close circuit of mechanism 59 is energized, and circuit breaker 11 closes. Also, since the load measuring-automatic reclosing circuitry was initiated, contact 75d is closed and the circuit breaker 11 is set up for automatic operation.

The load measuring automatic reclosing function can be locked out for the reasons given previously, but it can also be locked out for the following reasons:

1. If a trip input signal is applied to the system, relays 75 and 76 are immediately reset.
2. Under two emergency conditions:
    (a) As stated earlier, emergency conditions may arise wherein it is mandatory to shut down a whole substation by the operation of just one emergency switch. Obviously then, the automatic reclosing feature of a feeder circuit breaker 11 must also be defeated. To accomplish this function, contact 112 is provided.

When the emergency condition is acted upon, contact 112 is closed. When contact 112 closes, coil 85 is energized. Contact 85b closes to energize reset coil 76. Therefore, as described previously, contact 75c closes to trip circuit breaker 11, and contact 75d opens to defeat the load measuring-automatic reclosing circuitry. It is not possible to re-close circuit breaker 11 until contact 112 is again changed back to the open position.

(b) A mechanical trip push-button on circuit breaker 11 is provided to defeat reclosing under emergency conditions. Thus, the circuitry 59 will have associated therewith a push-button (not shown) for manual trip of the breaker. The operation of this push-button will cause the closing of contact 59a in series with coil 85 to energize coil 85. The sequence of operations described above will be initiated by the closing of contact 59a.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. The process of monitoring the condition of a feeder circuit and operating a d-c feeder breaker in the feeder circuit comprising the steps of:
   monitoring the voltage in a voltage-measuring mode across said feeder circuit and closing said breaker if the feeder voltage is above a first value, or initiating a load-measuring mode if said feeder voltage is lower than a second value that is lower than said first value;
   when in said load-measuring mode, connecting a Wheatstone bridge resistance measuring circuit to said feeder circuit, whereby the resistance of said feeder circuit defines one arm of the bridge and whereby the other three arms of said bridge have resistance values to permit a determination of the resistance of said feeder circuit;
   maintaining said feeder breaker open when the feeder resistance circuit measured during said load-measuring mode is below a given value; and
   closing said feeder breaker when said feeder circuit resistance measured during said load-measuring mode is above said given value.

2. The process of claim 1, which includes the further step of reinitiating said voltage-sensing and load-measuring modes a given number of times when the voltage measured during the load-measuring mode is below said given value and thereafter stopping said process.

3. The process of claim 1 wherein, if said feeder voltage is in a voltage range between said first and second values, said feeder breaker is not closed and said voltage-measuring and load-measuring modes are reinitiated.

4. The process of claim 2 wherein, if said feeder voltage is in a voltage range between said first and second values, said feeder breaker is not closed and said voltage-measuring and load-measuring modes are reinitiated.

5. The process of claim 1, wherein said first value is about 400 volts and said second value is about 30 volts.

6. The process of claim 1, wherein said given value is about 0.2 ohm.

7. The process of claim 1, 2 or 3, which further includes the step of connecting a voltage in series with said Wheatstone bridge which is equal and opposite to the feeder circuit voltage which is measured immediately before inserting said Wheatstone bridge into said circuit.

8. The process of claim 2 or 4, wherein said given number of times is greater than 10.

9. The process of claim 1, which includes the further steps of reinitiating said voltage-measuring and load-measuring modes a given number of times within a given time when said feeder circuit breaker is closed but thereafter trips open and thereafter stopping said process.

10. The process of claim 9, wherein said given number of times is two and said given time is six minutes.

11. An automatic reclosing system for a d-c feeder breaker in a d-c feeder circuit comprising:
first means connected to said d-c feeder circuit and to said d-c feeder breaker and operable to close said d-c feeder breaker when the voltage of said d-c feeder circuit is above a first value;
second means connected to said d-c feeder circuit and to said d-c feeder breaker and operable to close said d-c feeder breaker when the voltage of said d-c feeder circuit is below a second value which is less than said first value and the resistance of said d-c feeder circuit is greater than a given value which would be indicative of a fault condition on said feeder circuit;
said first and second means being independent of one another.

12. The system of claim 11, wherein said second means includes four resistors connected in a Wheatstone bridge circuit; switching circuit means for connecting said Wheatstone bridge circuit to said feeder circuit only during a relatively short impedance measurement interval; said feeder circuit connected in one arm of said bridge circuit and defining one of said four resistors; and resistance measurement means connected across the null points of said bridge circuit and connected to operate said feeder breaker when the resistance of said feeder circuit is greater than said given value.

13. The system of claim 11 or 12, wherein said given value for said resistance of said d-c feeder circuit is about 0.2 ohm.

14. The system of claim 12, which further includes capacitor means connectable to said feeder circuit before said Wheatstone bridge is connected to said feeder circuit and chargeable to the voltages of said feeder circuit; and second switching circuit means for connecting said Wheatstone bridge resistance measurement means in series with said capacitor means and said feeder circuit, with the voltage across said capacitor means in opposing polarity to the voltage of said feeder circuit.

* * * * *